United States Patent [19]

Harris

[11] Patent Number: 5,163,663

[45] Date of Patent: Nov. 17, 1992

[54] VISE HAVING PANTOGRAPHIC MOUNTING ASSEMBLY AND IMPROVED CLAMPING MECHANISM

[76] Inventor: Gerald R. Harris, P.O. Box 1148, Pryor, Okla. 74362

[21] Appl. No.: 713,591

[22] Filed: Jun. 10, 1991

Related U.S. Application Data

[63] Continuation of Ser. No. 274,468, Nov. 21, 1988, abandoned.

[51] Int. Cl.$^5$ .............................................. B23Q 3/08
[52] U.S. Cl. ..................................... 269/210; 269/32
[58] Field of Search ................. 269/32, 210, 137, 138, 269/24, 27, 37; 51/100 P

[56] References Cited

U.S. PATENT DOCUMENTS

| | | | |
|---|---|---|---|
| 1,193,090 | 8/1916 | Wardman | 269/137 |
| 2,600,402 | 6/1952 | Griffin | 51/100 P |
| 2,992,665 | 7/1961 | Mertz | 269/137 |
| 3,759,504 | 9/1973 | Hildebrand | 269/87 |
| 3,820,773 | 6/1974 | Aizawa | 269/32 |
| 4,117,756 | 10/1978 | Harris | 53/4 |

Primary Examiner—J. J. Swann
Attorney, Agent, or Firm—Flehr, Hohbach, Test, Albritton & Herbert

[57] ABSTRACT

A vise assembly providing clamping of workpieces and pantographic displacement of opposed vise jaw members in parallel in a direction generally transverse to the longitudinal axis of the workpiece. The vise assembly is a shuttle vise, and the pantographic mounting assembly is used with band saw apparatus in production cutting of bar stock, which tends to warp along its longitudinal axis. The vise assembly includes a clamping mechanism for holding the movable vise jaw against the vise ways to prevent diverging of the vise jaw faces and urging of large diameter workpieces up and out of the gripping jaws.

8 Claims, 4 Drawing Sheets

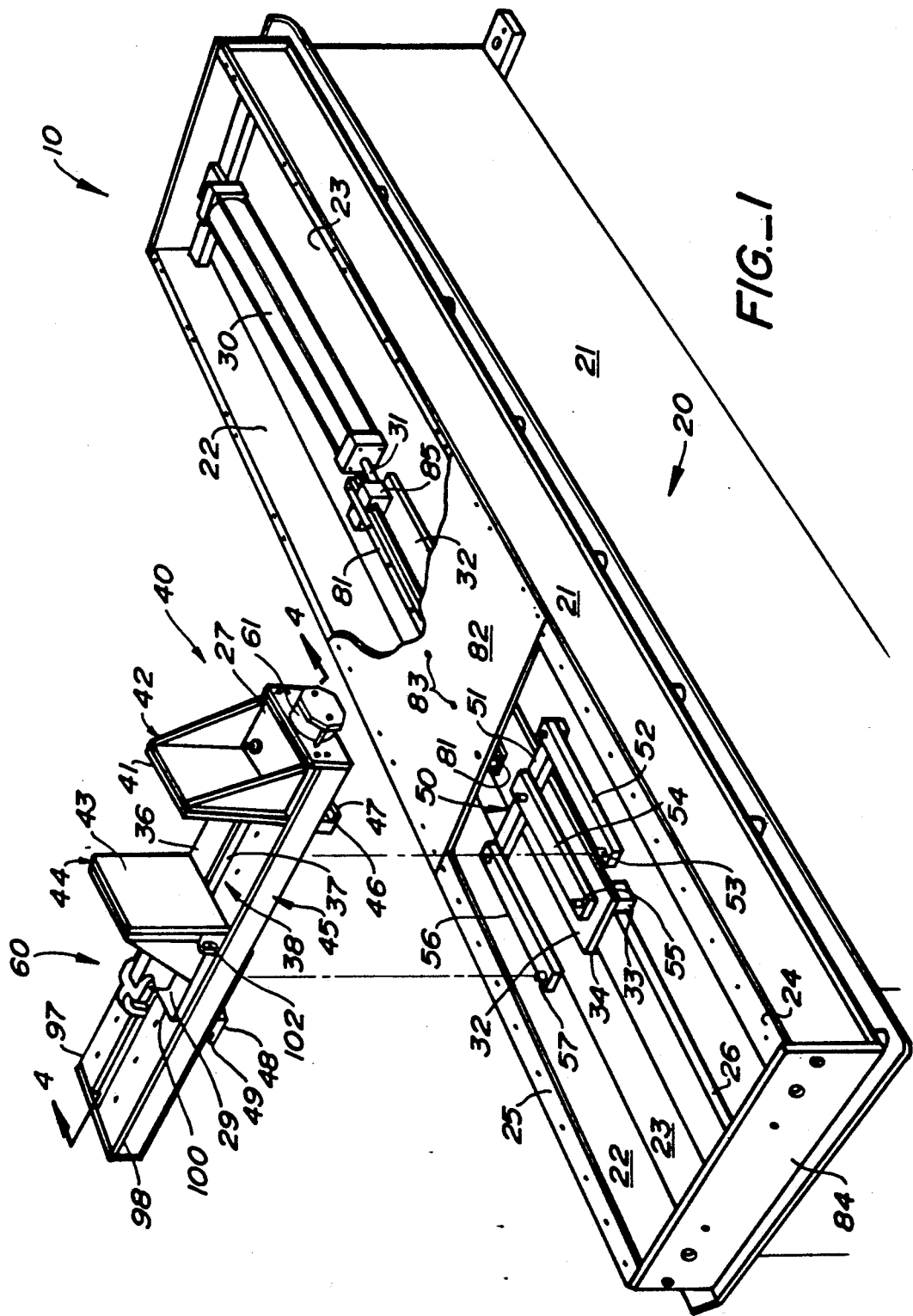
FIG._1

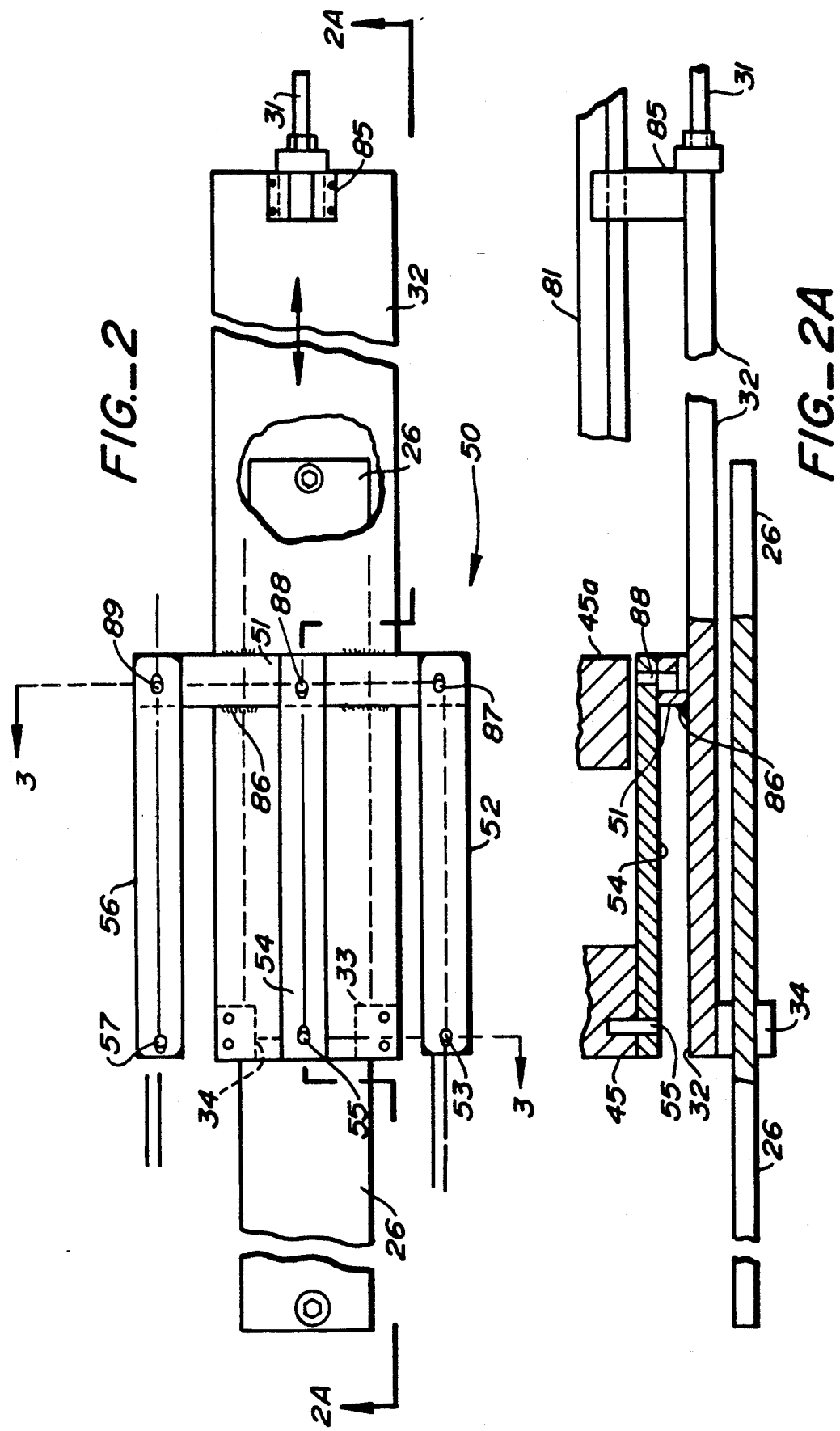

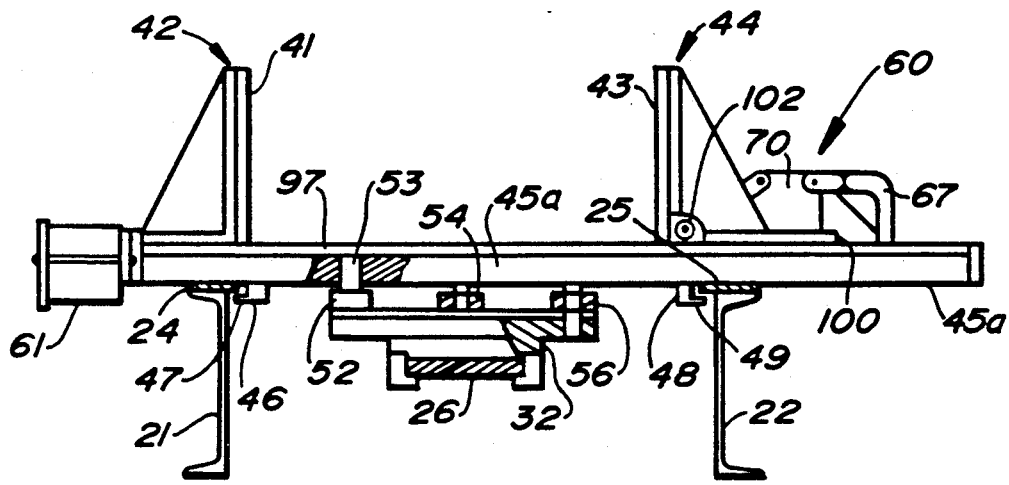
FIG._3
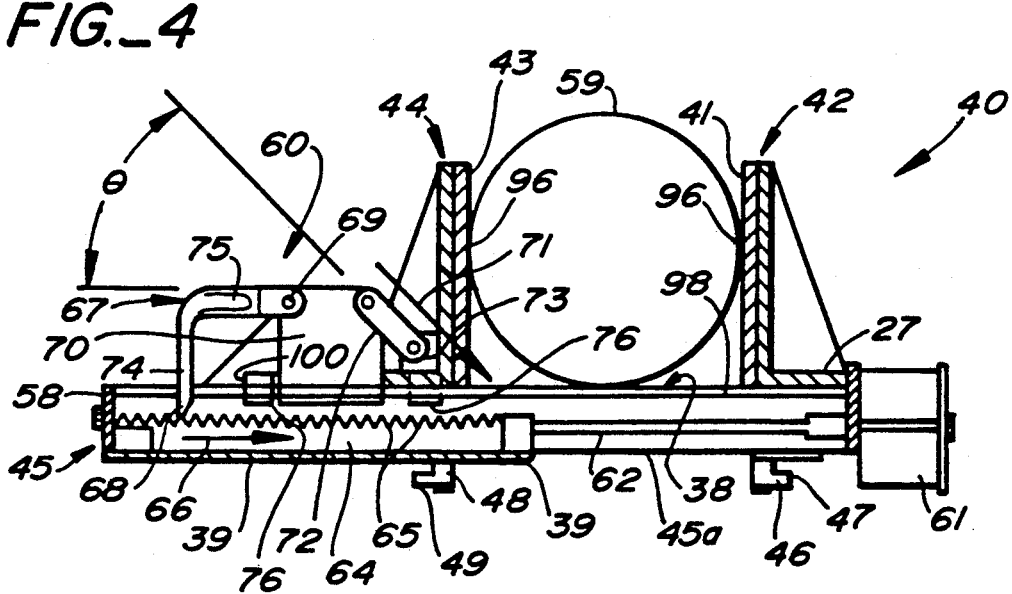
FIG._4

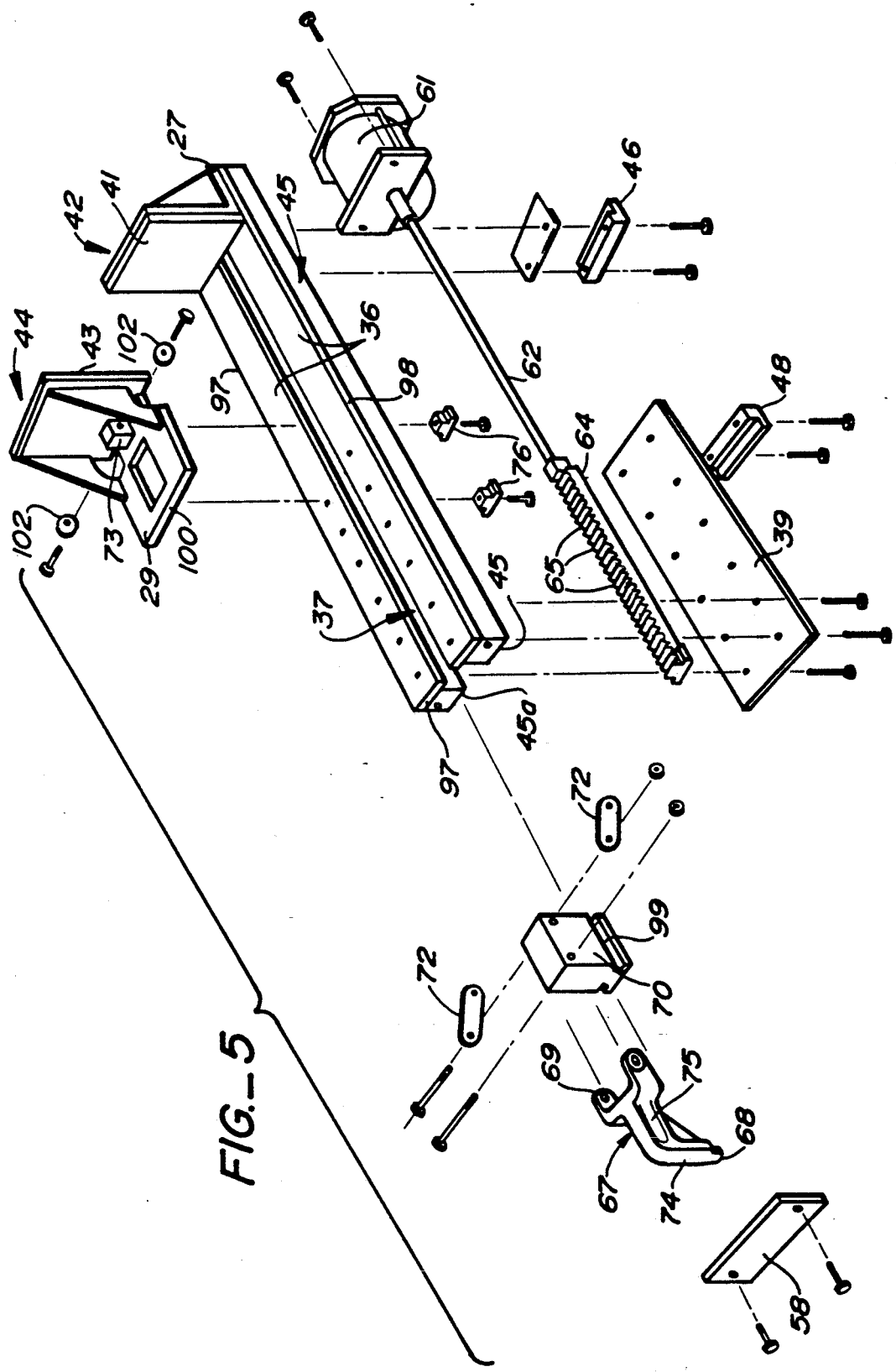
FIG._5

VISE HAVING PANTOGRAPHIC MOUNTING ASSEMBLY AND IMPROVED CLAMPING MECHANISM

This is a continuation of application Ser. No. 07/274,468 filed Nov. 21, 1988, now abandoned.

TECHNICAL FIELD

The present invention relates generally to vise assemblies for use with machinery, such as band saw apparatus and the like, wherein a workpiece is substantially rigidly clamped between opposed jaws of the vise assembly and an operation, such as cutting, scoring, or milling is then performed on the workpiece. The present invention relates, more specifically, to shuttle vise assemblies which are especially suitable for use in production cutting of workpieces with band saw apparatus.

BACKGROUND ART

Many different types and designs of vise assemblies for use with machinery, such as band saws, are known in the art. Vise assemblies typically comprise at least two opposed jaws defining a workpiece receiving and retaining channel, with at least one of the jaw members being laterally adjustable to effectuate clamping and releasing of the workpiece.

The vise assembly of the present invention is especially suitable for use with band saw apparatus for production cutting, and it is moreover particularly well suited for use as a movable or shuttle vise.

Conventional band saw apparatus generally utilize a stationary vise assembly mounted proximate the saw blade cutting stretch for clamping a workpiece in proximity to the desired cut. A shuttle vise assembly is positioned on a remote side of the stationary vise from the saw blade cutting stretch and reciprocates along a path perpendicular to the cutting stretch on a vise bench or feed table. The shuttle vise periodically advances a workpiece toward the cutting stretch for cutting of a series of cuts along the length of the workpiece. After each cut of the workpiece is complete, the shuttle vise assembly releases the workpiece and is displaced a predetermined distance away from the saw blade cutting stretch, the displacement distance corresponding to the desired cut of the next length of the workpiece. The shuttle vise assembly then clamps the workpiece, the stationary vise releases the workpiece, and the shuttle vise is displaced an equal distance toward the saw blade cutting stretch to move the workpiece into a cutting position. The stationary vise assembly then clamps the workpiece when it is in the cutting position, and both vises hold the workpiece while it is being cut.

Automatic or shuttle vises which are reciprocable along guides or tracks on a vise bench to automatically position the workpiece for a series of outs at appropriate positions are broadly well known in the art. Such a production shuttle vise assembly is shown, for example, in my U.S. Pat. No. 4,117,756.

One of the problems which is commonly encountered in connection with production sawing of workpieces using a band saw apparatus, and particularly in connection with production sawing of relatively large diameter lengths of bar stock, is the tendency of the clamping forces exerted by opposed jaws of the vise assembly to push the bar stock up and out of the vise assembly. This tendency toward upward displacement of the workpiece occurs because large diameter round stock engages the faces of the vise jaws toward the top of the vise faces. Conventional vise jaws usually will be urged toward each other at a position below the position at which large diameter round stock is gripped by the vise faces, which combines with the clearances inherent between the vise jaws and the vice ways to tend to push the workpiece up and out of the vise.

Additionally, as the length of the workpieces increases, warping of the workpieces along their longitudinal axes also creates vise alignment problems. Bar stock which is warped along its longitudinal axis is generally usable, since the bar stock will often be cut into short enough lengths that the warp is insignificant. During production sawing, however, it is difficult to rigidly clamp a warped workpiece in two locations, the shuttle vise and the stationary vise, while still holding the workpiece in substantially perpendicular alignment with respect to the cutting plane of the saw blade.

Both shuttle and stationary vises must include structures which permit the lateral adjustment of the stroke or clamping range of the vises. Vise assemblies are known in the art which have adjustable clamping strokes. For example, U.S. Pat. No. 3,759,504 teaches a vise assembly including a fixed jaw and a movable jaw for clamping a workpiece. The movable jaw is adjustably mounted on a toothed rack, and adjustment of the working range of the clamping stroke of the movable jaw is effected by means of a toggle mechanism. U.S. Pat. No. 3,820,773 teaches a vise assembly for feeding a workpiece into a cutting position on a cutting device, such as a band saw apparatus, wherein a pivoted lever is attached to the movable jaw, and the pivoted lever engages the top of a toothed rack. The rack is urged toward the workpiece and pushes the movable jaw toward the workpiece by means of a pivoted lever. The pushing mechanism for the rack is also coupled to a vertically movable roller which is moved up to engage and advance the workpiece.

Prior art adjustable stroke vise assemblies do not adequately overcome the problems outlined above, particularly problems related to properly positioning a shuttle vise assembly to accommodate a warped workpiece, such as may occur in a long section of bar stock, while maintaining the workpiece in a cutting position in substantially perpendicular alignment with respect to the saw blade cutting stretch. Prior art adjustable vise assemblies also do not satisfactorily overcome problems related to rigidly clamping workpieces between opposed jaws of the vise assembly to prevent the workpieces from being pushed up and out from the cutting position.

Accordingly, it is an objective of the present invention to provide a vise assembly which is particularly suitable for use with band saw apparatus for production cutting of workpieces.

It is still another objective of the present invention to provide a shuttle vise assembly for adjusting the opposed vise jaws of the shuttle vise to accommodate a warped workpiece while maintaining the workpiece in a cutting position in substantially perpendicular alignment with respect to a saw blade cutting stretch.

It is yet another objective of the present invention to provide a vise assembly including improved clamping means for preventing workpieces from being pushed up and out from the cutting position between opposed jaws of the vise assembly.

It is another objective of the present invention to provide an improved method for rigidly clamping a workpiece between opposed jaws of a vise assembly.

It is still another objective of the present invention to provide an improved method for adjustment of generally opposed jaws of a vise assembly as a unit while keeping them parallel to the workpiece receiving channel to accommodate and substantially rigidly clamp warped workpieces.

DISCLOSURE OF THE INVENTION

Vise assemblies according to the present invention comprise at least two opposed vise jaws defining a workpiece retaining channel. At least one of the jaws is laterally displaceable to vary the dimension of the workpiece retaining channel to accommodate workpieces having various configurations and dimensions. Lateral displacement of at least one of the opposed vise jaws also permits substantially rigid clamping of workpieces between the jaws, and release of workpieces from the clamped position after an operation, such as cutting, has been performed.

A preferred embodiment of the present invention includes a pantographic mounting assembly for the opposed jaws of a vise assembly to permit limited laterally displacement or floating of the vise assembly in a direction generally transverse to the workpiece retaining channel and the longitudinal axis of the workpiece. The pantographic mounting assembly of the present invention is especially useful for applications wherein a shuttle vise assembly is employed for production cutting of long sections of material, such as bar stock, which tends to warp along its longitudinal axis. Pantographic adjustment of opposed jaw members of a shuttle vise assembly maintains the jaws parallel to the workpiece receiving channel during displacement to provide improved clamping of warped workpieces, while maintaining the workpieces in a cutting position in substantially perpendicular alignment with respect to the cutting plane of the saw blade.

According to another preferred embodiment of the present invention, an improved clamping mechanism having means for exerting a force having a vertical, downward component on at least a movable one of the vise jaw members is provided to bias an upper edge of the jaw member toward the workpiece. The improved clamping mechanism prevents the clamping forces exerted by opposed vise jaw members from pushing workpieces up and out from the workpiece retaining channel.

BRIEF DESCRIPTION OF THE DRAWINGS

The above-mentioned and additional features of the present invention and the manner of obtaining them will become apparent, and the invention will be best understood by reference to the following more detailed description read in conjunction with accompanying drawings, in which:

FIG. 1 shows a partially exploded, top perspective view of a vise bench and vise assembly having a pantographic mounting assembly and improved clamping assembly constructed in accordance with the present invention;

FIG. 2 shows an enlarged top plan view of a vise assembly mounting means according to the present invention, including pantographic adjustment components;

FIG. 2A is a side elevation view, partially in cross section taken substantially along the plane of line 2A—2A in FIG. 2;

FIG. 3 shows a cross-sectional view of a vise assembly and mounting means of the present invention taken substantially along line of line 3—3 of FIG. 2;

FIG. 4 shows an end elevation view in cross section of the vise jaw portion of a vise assembly of FIG. 1 taken substantially along the plane of line 4—4 in FIG. 1; and FIG. 5 shows an exploded top perspective view of the vise assembly and improved workpiece clamping mechanism shown in FIGS. 3 and 4.

BEST MODE OF CARRYING OUT THE INVENTION

FIG. 1 illustrates a preferred embodiment of vise assembly 10 of the present invention, including vise mechanism 40 mounted on a vise support structure or feed table, generally designed 20. The configuration and dimensions of the feed table support structure may vary depending upon the application for the vise assembly, but the feed table support structure preferably includes with two longitudinally extending side walls 21, 22 extending upwardly beyond generally planar horizontal panel 23. Longitudinally extending guide rails 24, 25 are preferably mounted in proximity to the upper edges of side walls 21, 22 and project inwardly at generally right angles with respect to side walls 21, 22. Central guide rail 26 is preferably mounted on base panel 23 and extends longitudinally an substantially parallel to guide rails 24 and 25. Similarly central guide track 81 is mounted to feed table top plate 82 by fasteners 83 and is parallel to rails 24 and 25.

Vise mechanism 40 comprises at least two vise jaw members 42 and 44 mounted on vise base 45 and means for mounting the vise mechanism on feed table 20. Vise jaw members 42 and 44 preferably comprise generally right-angled structures having opposed clamping faces 41, 43, respectively, oriented generally perpendicular to mounting faces 27, 29 respectively. Clamping faces 41, 43 of the opposed vise jaw members and top surface 36 of the vise ways on base 45 define workpiece receiving and retaining channel 38. Two spaced guide rail gibs 46 and 48 are preferably mounted on a lower surface of base 45. Gibs 46 and 48 preferably include generally right-angled projecting legs 47 and 49, respectively, which are aligned for sliding engagement underneath longitudinally extending guide rails 24 and 25 on the feed table.

Vise support structure or feed table 20 is constructed for use of the vise assembly 40 as a shuttle vise, as will be described in more detail below. Accordingly, end 84 of table 20 will be positioned proximate a second vise support table carrying a stationary vise, not shown. The overall assembly of a feed table which includes both a stationary vise and an aligned shuttle vise proximate a band saw is shown in my U.S. Pat. No. 4,117,756 and is incorporated herein by reference and will not be described in detail.

It is necessary to provide a degree of lateral movement of vise mechanism 40 with respect to guide rails 24 and 25 in order that the shuttle vise will accommodate workpiece longitudinal warpage. According to a preferred embodiment of the present invention wherein the vise assembly includes a pantographic mounting assembly, it is important that gibs 46 and 48 are spaced at a distance affording some lateral clearance between the guide members and rails 24 and 25. In the preferred form this clearance is 0.262 inches or a maximum angle of the pantograph arms or bars of ½ degree.

Many different arrangements for reciprocating vise mechanisms are known in the art for use with shuttle vises and would be suitable for use with vise assembly 10 of the present invention. As shown in FIG. 1, a reciprocating assembly includes cylinder 30 with a piston 31, which is coupled to longitudinal extending, sliding thrust plate or member 32. Plate 32 is slidably engaged at one end on central guide rail 26 by means of gibs 33 and 34, and is slidably engaged on track 81 by gib member 85. The longitudinal spacing between gibs 33, 34 and 85 insures a high degree of alignment of the path of reciprocation of shuttle vise 40. Gibs 33, 34 and 85 are dimensioned and positioned to permit little or no lateral movement of sliding thrust member 32 with respect to central guide rail 26 and track 81. Reciprocation of piston 31 by cylinder 30 causes reciprocation of sliding member 32 on central guide rails 26 and 81 along the longitudinal axis of feed table support means 20.

It is important for many applications, such as vise assemblies for use with band saw apparatus, for the shuttle vise assembly to accommodate slight bends along the longitudinal axis of the workpiece, while maintaining the workpiece in a cutting position with respect to the band saw blade. In conventional band saw applications, for example, the longitudinal axis of the workpiece normally is arranged substantially perpendicular to a saw blade cutting stretch to achieve the desired cut. When relatively long workpieces have become warped but are still usable, it is desirable to provide floating adjustment of opposed shuttle vise jaw members to accommodate warped workpieces and rigidly clamp them during cutting.

According to the present invention, lateral float and alignment of vise jaws 42 and 44 to accommodate warped workpieces is accomplished by pantographic mounting assembly 50 illustrated in FIGS. 1 through 3. The pantographic mounting assembly links the reciprocating assembly with the base member 45 and the vise jaws mounted thereon.

Pantographic mounting of vise assembly 40 to force or thrust plate 32 of vise support table 20 is preferably accomplished by pivotally mounting a plurality of pivot arms or bars 52, 54 and 56 to a transverse mounting member or bar 51 secured rigidly (for example, by welds 86) to force bar 32. Bars 52, 54 and 56 are mounted at one end by pivot pins 87, 88 and 89 mounted on bar 51 and are mounted at an opposite end by pivot pins 53, 55 and 57 mounted on vise base 45. Bars or arms 52, 54 and 56 are spaced apart and parallel and the pivot pins at opposite ends are spaced at equal intervals. Thus, base 45, transverse bar 51 and pivot arm 52, 54 and 56 from a pantographic parallelogram which will cause base member 45 to remain parallel to bar 51 as the pivot bars swing from side-to-side from an aligned position with respect to force or thrust plate 32.

Pantographic lateral displacement of vise mechanism 40 is allowed by providing lateral clearance between gibs 46, 48 and longitudinally extending guide rails 24, 25, respectively. For example, in a normal or displaced condition, pivot bars 52, 54 and 56 will be aligned substantially perpendicular to transverse mounting bar 51 and gibs 46, 48 will be substantially centered with respect to guide rails 24, 25, as shown in FIG. 3. When a lateral reaction force is exerted on vise mechanism 40, however, such as by clamping or gripping a warped workpiece, the vise jaw members are laterally displaced while the workpiece receiving or retaining channel remains parallel to its original position as the channel is displaced laterally.

The workpiece gripping sequence is for the shuttle vise 40 to reciprocate to the right in FIGS. 1 and 2 or away from feed table end 84 and the stationary vise. The stationary vise grips the workpiece while the shuttle vise moves to the right. The shuttle vise then grips the workpiece and shifts right or left of center to accommodate workpiece warpage. The stationary vise opens, and shuttle vise 40 is displaced to the left to advance the workpiece beyond the stationary vise by an amount equal to the length of the workpiece to be cut off.

Next the stationary vise again grips the workpiece and shuttle vise 40, which is now more closely adjacent the stationary vise and will displace slightly to accommodate the lesser degree of warpage over the shorter distance. This system for lateral floating of the shuttle vise prevents the shuttle vise from fighting the stationary vise, which is closest to the cutting blade and should control the squaring-up or alignment of the workpiece during cutting.

It should be noted that the stationary and the shuttle vises preferably have faces which engage a relatively short length of the workpiece. Short faces on the stationary vise minimize the end stub length that is gripped to cut the last workpiece. Additionally, a short face on the shuttle vise, in combination with a short face on the stationary vise minimizes the tendency of the vises to grip warped workpieces along the front and rear edges of the vise faces when the shuttle vise floats laterally to accommodate warpage.

Pantographic mounting of the vise mechanism is limited by the amount of lateral clearance provided between gibs 46, 48 and guide rails 24, 25, respectively, to about 0.262 inches clearance, which is about one-half degree of pivoting to either side of the central axis for typical bars or arms having a length of about 8 inches.

In addition to the problem of workpiece warpage, the size and shape of a workpiece can create vise gripping problems. More particularly, cylindrical workpieces, which are of relatively large diameter, will engage the opposed vise faces 41 and 43 at a height above surface 36 which is relatively close to the top of faces 41 and 43. In standard vises there is a tendency for the movable vise face 43 to open up or diverge from the fixed face, causing the workpiece to be squeezed or to be urged upwardly and out of the vise.

The tendency of the movable vise face to tilt outwardly when gripping workpieces which load the vise proximate the top of surface 41 and 43 is largely the result of inherent clearances between gibs 76 which hold movable jaw 44 to base 45, and application of the clamping force to the movable jaw at a height below the height at which the workpiece engages face 43. Thus, as may be seen in FIG. 4, workpiece 59 engages face 43 at position 96, which is above, for example, slide block or member 70, which applies the clamping force to jaw 44. Without more, the couple between the clamping force and the reaction force at position 96 would tend to tilt face 43 to the left about end 100 of movable jaw base 29 by an amount limited by gib 76.

It should be noted that this tendency of large diameter workpieces to be squeezed upwardly out of the vise can be exacerbated by the workpiece warpage problem. Thus, if the shuttle vise and stationary vise are fighting each other, the induced stress in the shuttle vise can combine with factors, such as vibration, to accelerate upward displacement of workpiece 59. As described immediately above, therefore, the pantographic mount and the movable jaw assembly mount of the present invention, therefore, make gripping of large diameter cylindrical workpieces more effective and secure.

According to a preferred embodiment illustrated in FIG. 1, jaw member 42 is rigidly attached to top wall 36 of base members 45 and consequently remains stationary. Vise jaw member 44 is preferably slidably adjustable along slot 37 in top wall 36 of the base members to vary the dimension and capacity of workpiece retaining channel 38. A pair of gibs 76 may be mounted to and extend from horizontal leg 29 of movable vise jaw member 44 to engage beneath guide ways or rails 97 and 98 mounted to base members 45. Displacement of vise jaw member 44 along slot 37 between rails 97 and 98 allows gripping of workpieces of varying dimensions, or a number of workpieces simultaneously.

To provide more effective clamping forces on workpieces clamped in workpiece retaining channel 38 between opposed vise jaws 42 and 44, a clamping assembly generally designated 60 preferably is provided for exerting a force having a vertical, downwardly directed component on a movable one of the vise jaw members to bias horizontal leg 29 of vise jaw 44 down against the upper surface 36 of rail members 97 and 98.

FIGS. 4-6 illustrate a preferred embodiment of vise mechanism 40 and clamping assembly 60 in greater detail. The operating stroke of vise jaw 44 is laterally adjustable along slot 37 between guide rails 97 and 98 by means of cylinder 61 having rod 62 extending therefrom and secured to stroke adjustment rack member 64. Upon disengagement of pawl 67 from a notch in the stroke adjustment rack member, movable jaw 44 can be moved along rails 97 and 98 to a position proximate workpiece 59. Pawl 97 can then be dropped back down into engagement with rack 64. The stroke of jaw 44 will have a stroke equal to the stroke length of cylinder 61, with the range being determined by the placement of pawl 67 in rack 64. Stroke adjustment rack 64 is preferably provided with a plurality of spaced teeth alternating with notches or grooves 65 on its upper surface. Stroke adjustment rack 64 is slidably mounted on top of bottom plate 39 and between base members 45 and 45a.

Right-angled pawl 67 has a rack engagement end 68 at the terminal end of vertical leg 74 for engagement in grooves 65 of rack 64. End 68 preferably comprises a tapered end section having a configuration matching the configuration of grooves 65. Provided at the terminal end of horizontal leg 75 of pawl 67 is pivotal mounting means 69. Pawl 67 is thereby pivotally mounted to slidable block member 70, preferably in proximity to an upper corner of the block 70. As shown in FIGS. 1 and 6, pawl 67 may be provided with a generally U-shaped yoke at the terminal end of horizontal leg 75 for pivotal coupling to slidable block member 70, and block 70 is preferably received through a suitably sized opening in horizontal leg 29 of movable vise jaw 44. Grooves 99 in block 70 provide mating guided sliding of the block along rails 97 and 98 which define slot 37.

Slidable block member 70 is pivotally attached to one end of coupling links 72, preferably at an upper corner of slidable member 70 opposite the pivotal attachment of pawl 67. The opposite ends of coupling links 72 are pivotally attached to boss 73 projecting upwardly from horizontal leg 29 of movable vise jaw 44. Coupling links 72 also may comprise a single rigid link. Boss 73 is provided in proximity to the interface of vertical face 43 and horizontal mounting leg 29. Links 72 are oriented at an angle $\Theta$ (FIG. 4) with respect to horizontal leg 29 which is preferably from about 30 degrees to about 60 degrees and most preferably about 45 degrees.

Once the operating stroke of jaw 44 has been adjusted, workpiece 59 can be rigidly clamped in workpiece retaining channel 38 by displacing the piston in cylinder 61, and thus rack 64, in the direction of arrow 66 in FIG. 4.

As cylinder 61 moves rack 64 toward stationary vise jaw 42, the rack exerts a lateral force in the direction of arrow 66. This lateral force is transmitted through pawl 67 to slidable member 70. The lateral force transmitted to slidable member 70, in turn, is converted by angled coupling links 72 into a force 71 having a substantial downwardly directed force component.

The force in the direction of arrow 71 on coupling links 72 has a vertical, downwardly directed component which urges the downwardly facing surface of horizontal leg 29 of movable jaw 44 against upper surface 36 of base members 45 and 45a. This downward force component occurs even though vise jaws 42 and 44 may contact the workpiece at a height 96 well above the height of the clamping force applying block 70. As the angle $\Theta$ increases to 45 degrees and beyond, the vertical component of force 71 becomes equal to and then greater than the horizontal component. The horizontal component of force 71 is the gripping or clamping force applied to workpiece 59, and accordingly, when $\Theta$ equals 45 degrees the downward component or hold-down force urging leg 29 against the top surface 36 of rails 97 and 98 is proportional to, and in this case at least equal to the clamping force, regardless of the magnitude of the clamping force.

Moreover, links 72 apply the downward force to leg 29 at a position proximate vertical face 43. This insures that tilting of face 43 outwardly about remote edge 100 of face 29 will not occur and keeps face 43 perpendicular to vise bed surface 36. Thus, even for relatively large workpieces having a radius almost equal to the height of the vise jaws, movable jaw 44 is held or forced down against the vise bed rails 97 and 98, which prevents workpieces from being pushed up and out from the cutting position in the workpiece retaining channel. This feature of the present invention is especially important in applications such as production sawing of long, large diameter sections of bar stock having a generally circular cross-section.

In order to reduce the friction force generated by the downward component of force 71, it is preferable to provide roller means or wheels 102 proximate face 43 of the movable jaw. Smaller shuttle vises do not require wheels 102, but as the vises and clamping forces become larger, the friction force can reach fifty percent of the clamping force. Wheels 102 proximate face 43 and downward thrust links 72 effect a significant reduction in the friction force, while still permitting links 72 to maintain face 43 square with or perpendicular to surface 38 of vise ways 97 and 98.

Although the embodiments illustrated in FIGS. 1 and 4 show worktable support means 20, vise mechanism 40, and workpiece 59 aligned on a generally horizontal plane, the vise of the present invention may be aligned at an angle to the horizontal, or on a generally vertical plane.

While the vise assembly is illustrated clamping a single workpiece 59, it also will be understood that the vise mechanism of the present invention is suitable for clamping multiple workpieces as well.

In the foregoing specification this invention has been described in relation to certain preferred embodiments thereof, and many details have been set forth for purposes of illustration. It will be apparent to those skilled in the art, however, that the invention is susceptible to additional embodiments and that certain of the details described herein can be varied considerably without departing from the basic principles of the invention.

What is claimed is:

1. In a vise assembly including base means, two opposed jaws mounted to said base means and defining a workpiece retaining channel therebetween, at least one of said jaws being mounted to said base means for movement toward the other of said jaws to clamp said workpiece therebetween, a vise support structure, and mounting means provided on said base means mounting said vise assembly to said support structure, wherein the improvement in said vise assembly comprises:

said mounting means being pantographic mounting means having at least two spaced apart pivot bars oriented parallel to each other, said pivot bars are each pivotally mounted by a mounting assembly at a first end thereof to said support structure, and said pivot bars are each pivotally mounted by a mounting assembly at said second end thereof to said base means, said mounting assembly at said second end by an amount which is equal for each of said pivot bars, and said pantographic mounting means mounting said base means to said support structure for movement of said base means relative to said support structure in a direction transverse to said support structure by pivoting said pivot bars.

2. A vise assembly according to claim 1 wherein, said pantographic mounting means is mounted to means for reciprocating the vise assembly along said support structure.

3. A vise assembly according to claim 2 wherein, said vise assembly is mounted to said support structure, said support structure includes a pair of guide rails mounted thereon, said base member has gibs mounted thereon for sliding engagement with said guide rails mounted on said support structure, and said guide rails and said gibs being relatively positioned to define lateral clearance therebetween so that said base member is laterally movable with respect to said guide rails while said base means remains parallel to said original orientation.

4. A vise assembly according to claim 1 wherein, said pantographic mounting means includes three pivot bars with two outer pivot bars and a central pivot bar.

5. A vise assembly according to claim 1 wherein, said jaws are mounted to said base means by a clamping mechanism including means for urging a movable one of said jaws toward said base with a force proportional to said clamping force.

6. A vise assembly according to claim 5 wherein, said movable one of said jaws has a workpiece engaging face, and roller means mounted to said movable one of said jaws proximate said face and oriented to support said movable one of said jaws for rolling movement over said base toward the other of said jaws.

7. In a vise assembly for clamping a workpiece of the type having at least two generally opposed jaw members defining a workpiece receiving channel therebetween, at least one of said jaw members being laterally adjustable to clamp said workpiece, the improvement comprising:

pantographic mounting means for mounting of said vise assembly to a support structure, and said pantographic mounting means providing pantographic displacement of said vise assembly relative to said support structure in a direction generally transverse to a longitudinal axis of the workpiece while maintaining said jaw members parallel to said channel.

8. In a vise assembly for clamping a workpiece of the type having at least two generally opposed jaw members defining a workpiece retaining channel mounted to a vise base, at least one of said jaw members being laterally adjustable on said base, the improvement comprising:

means coupled to said one of said jaw members and urging said one of said jaw members toward the other of said jaw members to provide a clamping force, and said means coupled to said one of said jaw members further urging said one of said jaw members toward said base with hold-down force proportional to said clamping force said workpiece retaining channel;

said hold-down force is about equal to said clamping force and is applied to said one of said jaw members proximate a gripping face thereof; and said one of said jaw members carries wheel means proximate said gripping face oriented for rolling support of said one of said jaw members on said vise base in a direction of movement of said one of said jaw members during clamping.

* * * * *

UNITED STATES PATENT AND TRADEMARK OFFICE
CERTIFICATE OF CORRECTION

PATENT NO. : 5,163,663

DATED : November 17, 1992

INVENTOR(S) : Gerald R. Harris

It is certified that error appears in the above-identified patent and that said Letters Patent is hereby corrected as shown below:

Column 4, line 31, after "longitudinally" delete "an" and insert ---and---.

Column 9, line 30, after "assembly at said" insert ---first end being spaced from said mounting assembly at said---

Signed and Sealed this

Fifth Day of October, 1993

Attest:

BRUCE LEHMAN

*Attesting Officer*        *Commissioner of Patents and Trademarks*